United States Patent Office 2,711,923
Patented June 28, 1955

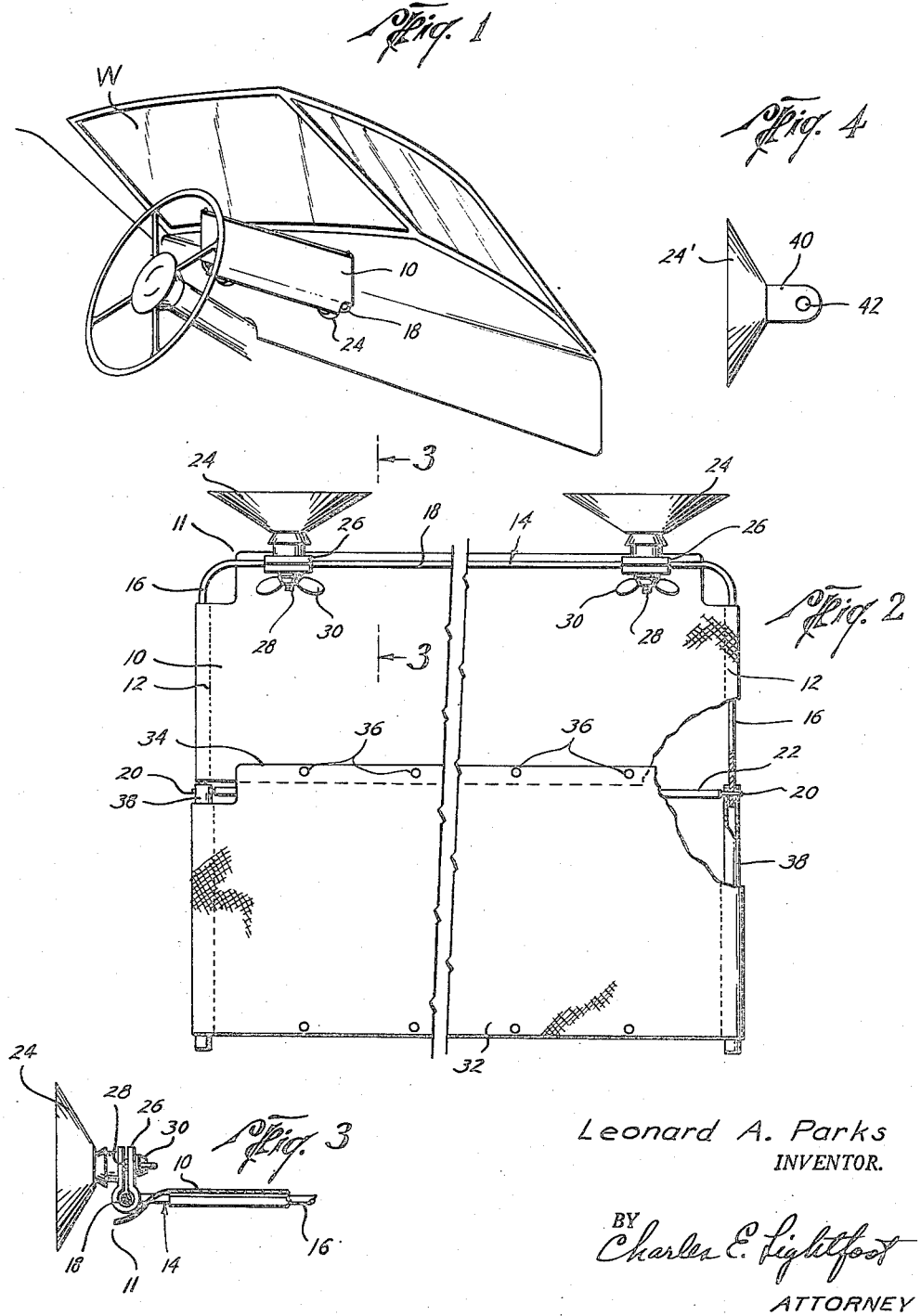

2,711,923

EXTENSIBLE SUN SHADE FOR AUTOMOTIVE VEHICLE

Leonard A. Parks, Houston, Tex.

Application October 4, 1952, Serial No. 313,163

3 Claims. (Cl. 296—97)

This invention relates to a sun shade, and more particularly to a portable device adapted to be removably attached to any convenient supporting surface, and which is adjustable to any desired position to provide protection from the sun.

The invention finds particular application as a sun shade in automobiles, or other vehicles, to protect the driver from the heat of the sun when driving toward the same, or to shade the seat of the vehicle when the same is parked in the open, whereby the seat is prevented from becoming uncomfortably hot. The invention also contemplates a device which may be utilized as a sun shade in any location where such a shade may be useful, and which may also serve as an awning or blind when desirable or expedient.

An important object of the invention is to provide a sun shade in the form of a strip of fabric or the like, having means for readily attaching the same to a supporting surface in any suitable location.

Another object of the invention is the provision of a sun shade having a detachable auxiliary portion or extension, whereby the size of the shade may be readily adjusted to adapt the same for use under particular conditions or circumstances where a shade of larger or smaller dimensions may be desirable.

A further object of the invention is to provide a sun shade embodying a strip of fabric or like material attached to a supporting frame and provided with means for detachably securing the frame to a supporting surface, so that the frame may be adjusted to any desired angle relative to the supporting surface, to provide the desired degree of protection against the sun.

A still further object of the invention is the provision of a sun shade in the form of a strip of fabric or like material attached to a supporting frame, which frame is provided with suction cups for securing the frame to any convenient supporting surface, the supporting structure also including clamp means by which the frame is fastened to the suction cups for pivotal adjustment in angular relation to the supporting surface.

The above and other important objects and advantages of the invention will best be understood from the following detailed description, constituting a specification of the same, when considered in conjunction with the annexed drawings, wherein—

Figure 1 is a perspective view of a portion of the interior of an automobile, showing the invention as applied to the windshield thereof;

Figure 2 is a top plan view of the invention, on a somewhat enlarged scale, showing the extensions applied thereto, and illustrating the manner in which the parts are assembled;

Figure 3 is a cross-sectional view taken along the line 3—3 of Figure 2, looking in the direction indicated by the arrows; and Figure 4 is a side elevational view of a somewhat modified form of the securing means employed in the invention.

Referring now to the drawings in greater detail, the numeral 10 designates a strip of fabric, or the like, preferably of generally rectangular shape, and formed with a hem at each end, as indicated at 12, 12, whereby the strip may be removably attached to a supporting frame, generally indicated at 14. The strip 10 may also have a flap portion 11 extending beyond one side edge thereof for a purpose later to be made apparent.

The frame 14 may be conveniently formed of metallic rod or wire, and generally U-shape, having opposite side arms 16, 16, of somewhat greater length than the width of the strip 10, and connected by a connecting portion 18. The side arms 16 are extended through the hemmed end portions 12, 12 of the fabric strip, so that the outer ends of the arms extend somewhat beyond the outer edge of the strip, and the outwardly projecting ends of the arms may be perforated, as best seen in Figure 2 of the drawings, to receive the reduced end portions 20 of a rod 22 extending between the arms and forming one side of the supporting frame.

One or more suction cups 24 are attached to the connecting portion 18 of the frame, by means of generally U-shaped clamping elements 26, whose arms are perforated for the insertion therethrough of threaded bolts 28, or the like, carried by the suction cups, and provided with tightening elements 28 in the form of wing nuts, knurled knobs, or the like, by which the clamping members may be tightened about the connecting portion 18.

The sun shade, constructed as described above is conveniently applied to the inside of the windshield of the vehicle, indicated at W in Figure 1 of the drawings, by compressing the suction cups in contact with the windshield, and when so attached the frame may be rotated in the clamping element 26, 26, to position the shade in any desired angular relation to the supporting surface, in order to protect the driver of the vehicle from the heat of the sun. In the present illustration the sun shade is shown extending upwardly and inwardly from the windshield immediately in front of the steering column of the automobile, so that the driver is shaded from the sun when driving toward the same, and at the same time the driver has a clear view over the top of the shade, so that this vision is in no way obstructed. It will also be seen that the flap portion 11 extends slightly beyond the connecting portion or bottom of the U 18 of the frame so that the fabric substantially covers the area of the frame.

As illustrated in Figure 2 the sun shade may be provided with an extension, or auxiliary portion comprising an additional strip 32 of fabric or other suitable material, of similar shape and construction to that of the strip 10, previously described, and having a portion 34 extending beyond one side edge thereof, which overlaps the adjacent side edge of the strip 10, the overlapping portions of the two strips being provided, if desired, with a number of spaced snap fasteners, indicated at 36, by which the two strips may be attached together. The strip 32 is supported on tubular frame extensions 38, which fit over the ends of the arms 16 of the frame, and which may be of a length to extend somewhat beyond the outer edge of the strip 32. The tubular extensions 38 may be perforated adjacent their ends, so that the extensions may be connected to the side arms 16 by aligning the perforations therein with the perforations in the side arms, and inserting the reduced portions 20 of the rod 22 therethrough. The strips 10 and 32 are preferably identical, but may of course be otherwise, and the side edge portions of the strips and the flap portions 11 and 34 may be provided with fastener elements whereby the strips may be interchangeably used.

When desirable or expedient the rod 22 may be positioned between the outer ends of the tubular extensions 38, beyond the outer edge of the strip 32, with the reduced portions 20 extending through the perforations in the outer ends of the extensions, and the inner ends of the extensions may be secured to the side arms 16 by a frictional fit or otherwise.

When not in use the tubular extensions 38 may be rolled up within the fabric strip 32 to form a compact bundle convenient for storage and transportation, and the strip 10 may be supported on the frame without the additional rod 22 if desired.

A somewhat modified form of suction cup which may be employed in the invention is shown in Figure 4 of the drawings. In this form of the securing means the suction cup 24' is formed in one piece, of rubber or the like, and is provided with a shank portion 40 having a small opening 42 therethrough. The suction cups 24' are applied to the frame by forcing the rod through the openings 42, the rod having a tight fit in the openings so that the frame is held in any desired position of adjustment by friction.

It will be appreciated that the invention as described above may be used in any desired location, such as on a side window of the vehicle, to shade the vehicle seat when the same is parked in the open, to prevent the seat from becoming uncomfortably heated by the sun, and the shade may also be used as an awning on the exterior of the vehicle, or as a shade or blind over a window, or in any other desired location.

It will thus be seen that the invention provides a sun shade of simple design and rugged construction, which may be formed in many different sizes, and which is capable of having its dimensions extended whereby it may readily be adapted to a wide variety of different purposes.

While the invention has been disclosed in connection with a specific embodiment of the same, it will be understood that this is intended by way of illustration only, and that numerous changes can be made in the construction and arrangement of the various parts, without departing from the spirit of the invention or the scope of the appended claims.

Having thus clearly shown and described the invention, what is claimed as new and desired to secure by Letters Patent is:

1. In a device of the character described, a frame comprising a substantially U-shaped frame member, tubular extensions telescopingly fitted on the arms of said member, a frame element extending between said arms and forming detachable connections between said arms and extensions, means pivotally connected to said member and adapted to be detachably secured to a supporting surface, a strip of fabric extending between and removably supported on said arms and a strip of fabric extending between and supported on said extensions, said strip on said arms extending beyond the frame in overlapping relation to said means.

2. In a device of the character described, a frame comprising a substantially U-shaped frame member, tubular extensions telescopingly fitted on the arms of said member, a frame element extending between said arms and forming rigid detachable connections between said arms and extensions, means pivotally connected to said member and adapted to be detachably secured to a supporting surface, a strip of fabric extending between and removably supported on said arms, a strip of fabric extending between and removably supported on said extensions, said strips having overlapping portions along their contiguous edges, and means detachably securing said overlapping portions together, said strip on said arms having a marginal portion extending beyond the bottom of said member in overlapping relation to said means.

3. In a device of the character described, a frame comprising a substantially U-shaped frame member the end portions of the arms of said member being perforated, tubular extensions telescopingly fitted on said arms and having openings adjacent their ends adapted to be aligned with the perforations in said arms, a frame element extending between said arms and having end portions of reduced diameter adapted to extend through said openings and perforations to detachably connect said extensions and arms, means pivotally connected to said member and adapted to be detachably secured to a supporting surface, and fabric strips extending between and removably supported on said arms and extensions, said strip on said arms having a marginal portion extending beyond the bottom of said member in overlapping relation to said means.

References Cited in the file of this patent

UNITED STATES PATENTS

| | | |
|---|---|---|
| 1,392,474 | Bedard | Oct. 4, 1921 |
| 1,483,640 | Manning | Feb. 12, 1924 |
| 1,605,682 | Mewborn | Nov. 2, 1926 |
| 2,321,216 | Lesko | June 8, 1943 |
| 2,410,171 | Le Lande | Oct. 29, 1946 |
| 2,555,228 | Evers | May 29, 1951 |
| 2,565,545 | Card | Aug. 28, 1951 |
| 2,594,386 | Blessen | Apr. 29, 1952 |